United States Patent [19]

Mamin et al.

[11] Patent Number: 5,017,010
[45] Date of Patent: May 21, 1991

[54] HIGH SENSITIVITY POSITION SENSOR AND METHOD

[75] Inventors: Harry J. Mamin; Daniel Rugar, both of Palo Alto, Calif.

[73] Assignee: International Business Machines Corporation, Armonk, N.Y.

[21] Appl. No.: 352,804

[22] Filed: May 16, 1989

[51] Int. Cl.⁵ .............................................. G01B 9/02
[52] U.S. Cl. ................................... 356/345; 356/358
[58] Field of Search ............................. 356/345, 358; 250/227.19, 227.27

[56] References Cited

U.S. PATENT DOCUMENTS 4,572,670  2/1986  Fredrickson .............. 250/227.27 X
4,652,744  3/1987  Bowers et al. .................. 250/227
4,724,318  2/1988  Binnig ........................... 250/306

FOREIGN PATENT DOCUMENTS 3311809  10/1984  Fed. Rep. of Germany .

OTHER PUBLICATIONS

G. Meyer & N. M. Amer, "Novel Optical Approach to Atomic Force Microscopy", *Appl. Phys. Lett.* 53 (12), Sep. 19, 1988, pp. 1045-1047.
A. D. Drake & D. C. Leiner, "Fiber-Optic Interferometer for Remote Subangstrom Vibration Measurement", *Rev. Sci. Instrum.* 55(2) Feb. 1984, pp. 162-165.
Rugar, Mamin, Erlandsson, Stern, Terris, "Force Microscope Using a Fiber-Optic Displacement Sensor", *Rev. Sci. Instrum.* 59 (11), Nov. 1988, pp. 2337-2340.
H. Hattori & T. Takeo, "Optical Fiber Position Sensor Using a Frequency Modulated Semiconductor Laser", *SPIE*, vol. 838 *Fiber Optic & Laser Sensors V* (1987) pp. 288-291.
A. Lew, C. Depeursinge, "Single-Mode Fiber Evanescent Wave Spectroscopy", *SPIE*, vol. 514 (Sep. 1986) 2nd Int'l Conf. on Optical Fiber Sensors, pp. 71-74.

*Primary Examiner*—Davis L. Willis
*Assistant Examiner*—Matthew W. Koren
*Attorney, Agent, or Firm*—Henry E. Otto, Jr.

[57] ABSTRACT

A highly sensitive apparatus for sensing the position of a movable member comprises an optical directional coupler providing four external ports. Light from a short coherence length diode laser is injected into the first port. The coupler serves as a beam splitter to direct one portion of the injected light to the member via the second port and a single mode optical fiber. Part of this one portion is reflected concurrently from the member and from the adjacent polished coating at the end face of said fiber back into said fiber and optically coupled via the third port to a photodetector to provide a signal whose amplitude is indicative of the position of the member, based upon the relative phase of said concurrent reflections.

The other portion of the injected light is optically coupled to and via the fourth port to another photodetector for providing, as a reference, a signal proportional to the intensity of the injected light. These two signals are supplied to a subtractive circuit for providing an output in which power fluctuations of the laser are minimized.

17 Claims, 2 Drawing Sheets

HIGH SENSITIVITY POSITION SENSOR AND METHOD

This invention relates to a high sensitivity position sensing apparatus and method, and more particularly to a fiber-optic interferometric sensing apparatus and method for detecting slight movements of a movable member, such as a cantilever in an atomic force microscope.

BACKGROUND OF THE INVENTION

Fiber optic position or displacement sensors are useful for remote sensing of motion, such as in atomic force microscopes or for the detection of acoustic waves or the measurement of vibration. Several fiber-optic sensors utilizing optical interference effects have heretofore been proposed.

I

U.S. Pat. No. 4,652,744 to Bowers et.al. describes a displacement sensor used for acoustic wave detection. It uses the interference of two components of light reflected from the same point on a sample, one component of which is delayed in time by a fiber optic delay line. This method has the disadvantage that it cannot detect slowly changing displacements. The lowest frequency that can be detected is determined by the time delay in the fiber optic delay line.

II

Appl. Phys. Lett. 53, 12 (1988) discloses an atomic force microscope disposed in a vacuum and comprising a cantilever having a tip disposed adjacent a sample and a mirror attached to its backside to facilitate reflection of a laser beam from the cantilever onto a position-sensitive detector. While this arrangement works acceptably in many cases, it requires a highly reflective surface on the cantilever and is not suitable, for example, when the cantilever is made from a fine wire or the like.

III

Rev. Sci. Instr. 55, 162 (1984) and a variation thereof published in Rev. Sci. Instr. 59, 2337 (1988) disclose a fiber optic interferometer which can detect slowly changing displacements and is used for vibration measurements. These devices comprise a long coherence length gas laser and polarization-sensitive optics. Horizontally polarized light from the gas laser is transmitted through a polarizing beam splitter and launched into the optical fiber. The light passes through a fiber loop that acts analogously to an optical quarter-wave plate. The fiber loop converts the horizontally polarized light into circularly polarized light, which then travels to the end of the fiber. Light that reflects from the end of the fiber interferes either destructively or constructively with light reflected by the object. The relative phase of the two reflecting components determines the total amount of circularly polarized light that propagates back through the fiber. The fiber loop acts on the circularly polarized light to convert it to vertically polarized light. This vertically polarized light leaves the fiber and is reflected by the polarizing beam splitter to a photodiode detector.

The apparatus described in these references has the following disadvantages:

(1) Bulky components such as the gas laser, objective lens, and beam splitter are used. Between components, the light propagates through air, making the system susceptible to disturbance due to air currents and acoustic noise.

(2) Manual alignment of the various components is necessary. Routine realignment is necessary to accurately focus the light into the core of the single mode fiber, which is very small.

(3) The detection method is based on polarization of the light and relies on the polarizing beam splitter to separate the light that is reflected by the object from the light which is incident from the laser. To make this work properly, the fiber loop size and orientation must be adjusted to ensure that the light returning from the fiber has the proper vertical polarization. Unfortunately, other incidental bends in the fiber will disturb the polarization. Also, the polarization will be temperature sensitive since the birefringence of the fiber is temperature sensitive.

(4) Since a long coherence length helium-neon gas laser is used, stray reflections from other parts of the apparatus can interfere either constructively or destructively with the light coming from the end of the fiber. The phase of the stray reflections determines whether the interference is constructive or destructive. Since the phase of the stray reflections varies with temperature, etc., this leads to an unstable signal (low frequency noise).

IV

SPIE Proceedings Vol. 838, pp. 288-291 describes an optical fiber displacement sensor which uses a frequency modulated diode laser and a wave guide coupler. Frequency modulated light is coupled into a multimode optical fiber through a fiber coupler and the light is directed onto the object by a lens. The frequency difference between light reflected from the object and light reflected from the end of the fiber causes the optical power to oscillate at a beat frequency determined by the distance between the object and the end of the fiber. This beat frequency is measured with a frequency counter. This method has the following disadvantages:

(1) Frequency modulation of the diode laser depends critically on the proper choice of bias current and is a function of temperature and individual diode characteristics.

(2) Measuring the beat frequency accurately is a slow process, therefore the bandwidth of the measurement is limited.

(3) The optical beam size emerging from the lens is on the order of 1 mm. Thus the method is not suited for measuring small objects, such as force microscope cantilevers which can have dimensions on the order of several micrometers.

V

SPIE Proceedings Vol. 514, pp. 71-74 describes an optical fiber absorption spectrometer. It uses light transmitted to a sensing cell through single mode fiber and a fiber coupler. The sensing cell consists of a region where the fiber core is exposed to the liquid whose absorption spectrum is to be sensed. A mirror at the end of the fiber in the sensing cell reflects the light back through the coupler to the photodetector. The amount of light detected by the photodetector depends on the absorption spectrum of the liquid. The device is not a position or displacement sensor and, although it has some commonalty in configuration, it does not use interference effects for sensing.

There is a need for a highly sensitive position sensing apparatus of the fiber-optic interferometric type which incorporates the following highly desirable features: minimal polarization sensitivity, minimal sensitivity to the thermal response of the fiber optic components; compactness of configuration; use of a short coherence length laser; and absence of optical adjustments.

SUMMARY OF THE INVENTION

Toward this end and according to the invention, a highly sensitive apparatus for sensing the position or displacement of a movable member is provided which comprises an optical directional coupler providing a plurality of external ports. Light from a short coherence length diode laser is injected into one of the ports. The coupler serves as a beam splitter to direct one portion of the injected light to the member via a second port and a single mode optical fiber. Part of said one portion of the light is reflected concurrently from the member and from the adjacent cleaved end of said fiber back into said fiber and optically coupled via a third port to a photodetector to provide a signal whose amplitude is indicative of the position of the member, based upon the relative phase of said concurrent reflections.

The other portion of the injected light is preferably transmitted by optical coupling through a fourth port to another photodetector for providing, as a reference, a signal proportional to the intensity of the injected light. These two signals are preferably supplied to a subtractive or dividing circuit or the like for providing an output in which power fluctuations of the laser are minimized.

DESCRIPTION OF PREFERRED EMBODIMENT

Figure 1:
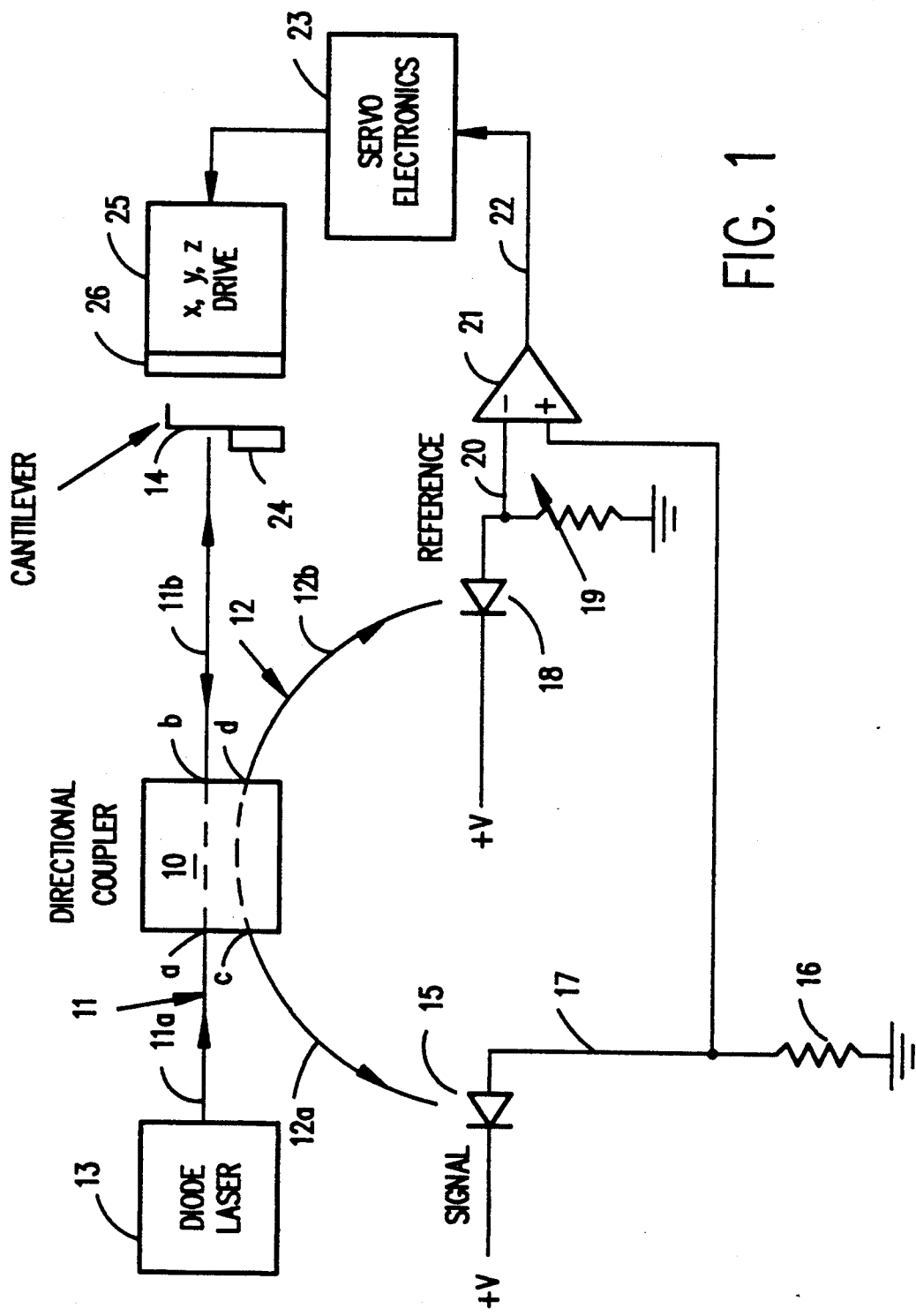
FIG. 1 is a schematic diagram of a position sensing apparatus embodying the invention shown applied, for sake of illustration, to an atomic force microscope (AFM)

As illustrated in FIG. 1, the position sensing apparatus embodying the invention comprises a conventional fiber directional coupler 10 having four ports a, b, c, d. Coupler 10 optically couples two single mode optical fibers 11, 12 having four external leads 11a, 11b, 12a, 12b extending from ports a, b, c, d, respectively. A diode laser 13, injects light into port a via one end of fiber 11. Coupler 10 acts as a nonpolarization-sensitive beam splitter which directs substantially half of the light via port b and fiber 11 to a member 14 whose position is to be sensed.

Figure 2:
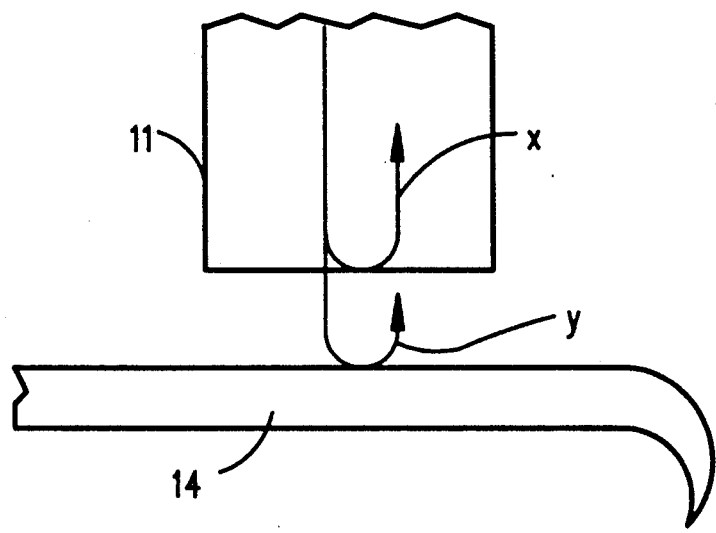
FIG. 2 is a fragmentary view, to greatly enlarged scale, of a portion of the apparatus shown in FIG. 1 to illustrate the optical paths of the light reflected from the fiber end and the member, such as the cantilever of an AFM, whose position is to be sensed.

Light is reflected from the end of fiber 11 near member 14 and also from the member itself. The interference condition for these two reflections x and y (see FIG. 2) depends on the relative phase of the two reflections and determines the total amount of light reflected back through fiber 11. The reflected light traveling back through fiber 11 is optically coupled by coupler 10 and transmitted via port c to fiber 12 and directed to a photodetector 15.

Photodetector 15 may comprise a photodiode connected to a voltage source +V and connected to ground via a resistor 16. Photodetector 15 provides an output signal in line 17 which responds to the motion of member 14 and thus senses its position. The amplitude of this signal can be used as the signal for sensing the position of member 14. However, means, such as now to be described, are preferably provided for substantially cancelling power amplitude fluctuations in the laser 13.

As illustrated, the other half of the light injected into fiber 11 is preferably optically coupled by coupler 10 and transmitted via fiber 12 to a photodetector 18, such as a photodiode connected to a voltage source +V and to ground via an adjustable resistor 19. The photodetector 18 provides, as a reference, an output signal in line 20 that is proportional to the light injected by laser 13 into fiber 11.

The position output signal in line 17 is suitably matched against the reference output signal in line 20 to minimize the effect of power fluctuations in laser 13. As illustrated, a circuit or differential amplifier 21 subtracts the reference signal from the position signal. However, if preferred, a divider or other circuit could be substituted for circuit 21. In either event, the output in line 22 of the circuit 21 or its equivalent is used to sense, or if desired through suitable servo feedback electronic circuitry 23, control the position of member 14 relative to some other element or vice versa.

Figure 3:
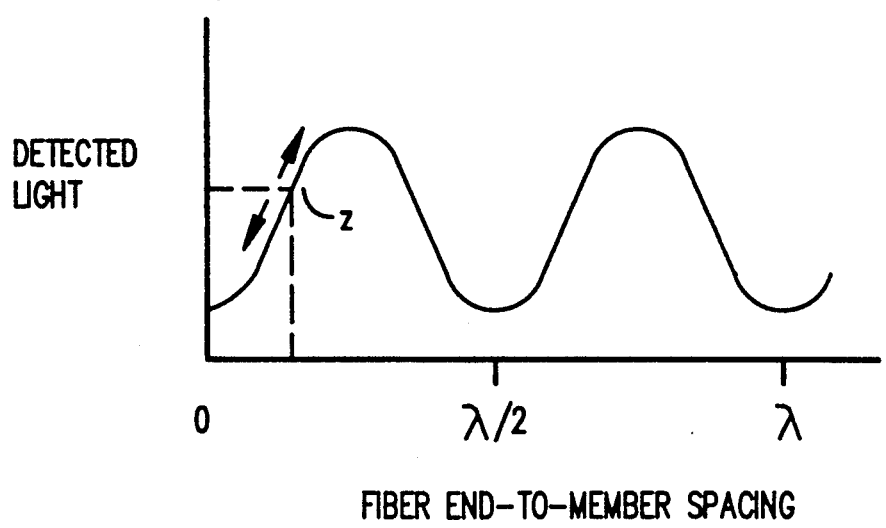
FIG. 3 is a plot showing variations in detected light versus fiber end-to-member spacing.

As shown in FIG. 3, the amplitude of the optical power detected at photodetector 15 varies as a function of the spacing between the end of fiber 11 and member 14. The amplitude changes from minimum to maximum for a displacement of $\lambda/4$, where $\lambda$ is the optical wavelength. The preferred operating point for detecting small displacements or position changes is at z, the steepest part of the curve, which is approximately half the distance between minimum and maximum.

As illustrated, member 14 is a cantilever arm of a force microscope, such as an atomic force microscope (AFM), of the type disclosed in U.S. Pat. No. 4,724,318 assigned to the assignee of the present invention. The AFM, as therein fully described, comprises a piezoelectric element 24 connected to the member 14 and an x, y, z drive 25, for controlling movement of a sample 26 relative to the tip of cantilever member 14. The specific means by which the x, y, z drive 24 controls movement of sample 26 and the manner in which the piezoelectric element 24 (or a bimorph equivalent) operates on the cantilever member 14 form no part of this invention. However, as illustrated, the servo feedback circuitry 23 would control the z-drive portion of drive 25.

To enhance reflectance at the end of lead 11b of fiber 11, the end face of the fiber facing member 14 preferably has a partially reflecting coating a few hundred angstroms thick of a metal, such as silver or aluminum. Alternatively, if preferred, the coating may comprise a quarter-wavelength thickness of a dielectric having a high index of refraction, such as $ZrO_2$.

Stray reflections from the ends of leads 12a, b of fiber 12 at the photodetectors 15 and 18, respectively, can be minimized by immersing the fiber ends in an index matching liquid, such as Series A marketed by Cargille of Cedar Grove, New Jersey, or by polishing said ends so that the plane of the ends of said fiber are not perpendicular to the axis of the fiber.

To optimize performance, the laser light source 13 should have short coherence length to minimize interference effects from stray reflections. Laser 13 should therefore be of the multi-mode variety. Diode laser 13 preferably is of the type having a fiber optic output, such as the Model GO-DIP 1000 marketed by General Optronics of Edison, N. J. If preferred, however, source 13 may be a super-radiant diode or a light emitting diode which has short coherence length. Alternatively, short coherence length can be achieved by modulating a single mode diode laser at high frequency.

While the invention as illustrated depicts the member 14 and photodiode 18 adjacent the ends of fibers 11 and 12, respectively, it will be understood that, if preferred, member 14 and photodiode 18 may be disposed adjacent the ends of fibers 12 and 11, respectively.

Also, if desired, the directional coupler 10 can be an integrated optical device in which the diode laser 13 and photodetectors 15, 18 are connected directly to the ports a, c, d, respectively, of the directional coupler rather than by leads 11a, 12a, 12b connected to said ports. In such case, the lengths of the "leads" to the diode laser and photodetectors would be substantially zero.

It will now be seen that the apparatus and method embodying the invention possess the following advantages:

(1) Use of compact components with direct fiber interconnection. Because there is no air path between components, sensitivity to air currents and acoustic noise is minimal. Because the components have direct fiber interconnections, they never need realignment.

(2) Use of a fiber directional coupler which is not sensitive to polarization, and therefore is polarization independent and immune to polarization changes that inevitably arise due to ambient temperature variation and/or to bending of the fiber. Also, the need for a fiber loop and associated adjustments is desirably eliminated.

(3) Use of a short coherence length light source, such as a multi-mode laser diode, a single mode laser diode modulated at high frequencies, or a light emitting diode (LED). The short coherence length assures that stray reflections from other parts of the apparatus will not have a definite phase relationship with the signal light. Thus the signal will be much more stable against variations in temperature and other disturbances.

(4) The light from the laser can be monitored. Amplitude fluctuations can be cancelled by an appropriate circuit, such as a divider circuit or a differencing circuit.

(5) A frequency modulated light source is not required.

(6) The light is confined to less than 5 micrometers in diameter by use of single mode optical fibers. Thus, movement of small objects, such as AFM cantilevers, can be measured without requiring lenses to reduce the optical spot size.

While the invention has been shown and described with reference to a preferred embodiment thereof, it will be understood by those skilled in the art that the fiber optic position sensor herein disclosed may be used for other purposes, such as for detection of acoustic waves or for measurement of vibration or surface roughness, and that changes in form and detail may be made without departure from the scope and teaching of the invention. Accordingly, the apparatus and method herein disclosed are to be considered merely as illustrative, and the invention is to be limited only as specified in the claims.

What is claimed is:

1. A highly sensitive apparatus for sensing the position of a member, said apparatus comprising:

an optical directional coupler having one port for receiving injected light;

a single mode optical fiber extending from another port of the coupler;

first photodetector means optically connected to a third port of the coupler;

means, including other photodetector means, adjacent to a fourth port of the coupler for providing, as a reference, an output signal proportional to the light injected into said one port; and means responsive to said output signals for minimizing the effect of power fluctuations in said injected light;

said coupler being operative to direct to said member via the fiber one portion of said injected light and direct to said first photodetector means via said fiber and third port part of said portion reflected concurrently from the member and from the end of said fiber for causing said first photodetector means to provide an output signal based upon the relative phase of said concurrent reflections, the amplitude of which signal is indicative of the position of the member.

2. The apparatus of claim 1, wherein the member is a deflectable cantilever beam forming part of an atomic force microscope.

3. The apparatus of claim 1, comprising a diode laser for providing the injected light, said laser having short coherence length to minimize interference effects from stray reflections.

4. The apparatus of claim 1, comprising a super-radiant diode as the source of the injected light.

5. The apparatus of claim 1, wherein the end face of said fiber has a partially reflecting coating to enhance reflectance therefrom.

6. The apparatus of claim 5 wherein said coating comprises a reflective metal having a thickness of the order of several hundred angstroms.

7. The apparatus of claim 5, wherein said coating comprises a thickness of approximately a one-quarter wavelength of a dielectric material having a high index of refraction.

8. A highly sensitive apparatus for sensing the position of a member, said apparatus comprising:

a fiber directional coupler including a plurality of optically coupled single mode optical fibers providing a plurality of leads into a first one of which light is injectable;

first photodetector means;

said coupler being operative to direct to said member via a second one of the leads one portion of said injected light and direct to said first photodetector means via a third one of said leads part of said portion reflected concurrently from the member and from the end of said second lead for causing said first photodetector means to provide an output signal based upon the relative phase of said concurrent reflections whose amplitude is indicative of the position of the member;

means, including other photodetector means, adjacent to the end of a fourth one of the leads for providing, as a reference, an output signal proportional to the light injected into said first lead; and means responsive to said output signals for minimizing the effect of power fluctuations in said injected light.

9. The apparatus of claim 8, wherein stray reflections from the end of said third lead are minimized by polishing said last-named end so that its plane is not perpendicular to the axis of said third lead.

10. The apparatus of claim 8, wherein stray reflections from the end of said third lead are minimized by immersing the last-named end in an index-matching liquid.

11. The apparatus of claim 8, wherein the end of at least one of said third and fourth leads is polished so that its respective plane is not perpendicular to the axis of the associated lead for minimizing stray reflections.

12. The apparatus of claim 8, wherein the end of at least one of said third and fourth leads is immersed in an index-matching liquid to minimize stray reflections therefrom.

13. A method for sensing the position of a member, comprising the steps of:
providing an optical coupler having a plurality of ports;
providing a first photodetector;
injecting light via one of the ports through the coupler for causing a portion of the injected light to be directed to the member via a second port and a single mode optical fiber closely adjacent to the member and causing part of said portion to be reflected concurrently from the member and from the end of said fiber back through the coupler and directed via a third port to the first photodetector for providing an output signal whose amplitude is indicative of the position of the member and is based upon the relative phase of said concurrent reflections;
providing a second photodetector; and
directing the remaining portion of the injected light to said second photodetector via a fourth port to provide a signal proportional to the injected light for minimizing the effect of fluctuations in power of the injected light.

14. The method of claim 13, including the step of:
minimizing interference effects from stray reflections by using a diode laser having short coherence length as the source of injected light.

15. The method of claim 13, including the step of:
applying a partially reflecting coating at the end face of the fiber to enhance reflectance therefrom.

16. A method for sensing the position of a member, comprising the steps of:
providing means for optically coupling a pair of single mode optical fibers having external leads;
providing a pair of photodetectors; and
injecting light into one end of a first lead and through the coupling means for causing one portion of the injected light to be directed via a second lead to the member and causing part of said one portion of injected light to be reflected concurrently from the member and from the end of said second lead and injected back through the coupling means and directed via a third lead to one of the photodetectors for providing an output signal whose amplitude is based upon the relative phase of said concurrent reflections and indicative of the position of the member, and causing the other portion of the injected light to be directed via a fourth lead to the other photodetector to provide a signal proportional to the injected light; and
combining said signals to provide an output indicative of the position of the member in which the effect of fluctuations in power of the injected light is minimized.

17. The method claim 16, including the step of:
polishing the end face of at least one of said third and fourth leads so that its respective plane is not perpendicular to the axis of the associated lead for minimizing stray reflections.

* * * * *